FIP8102 XR 2,699,496 ROSS REFERENCE SEARCH ROOM

Jan. 11, 1955 H. MAGNUSKI ET AL 2,699,496

MICROWAVE RELAY TEST SYSTEM

Filed April 3, 1952 4 Sheets-Sheet 1

INVENTORS
Henry Magnuski
Harvey M. Ross
BY Foorman L. Mueller
Atty

INVENTORS
Henry Magnuski
Harvey M. Ross
BY
Forman L. Mueller
Atty.

MICROWAVE RELAY TEST SYSTEM

Filed April 3, 1952 4 Sheets-Sheet 3

INVENTORS
Henry Magnuski
Harvey M. Ross
BY
Foorman L. Mueller
Atty

INVENTORS
Henry Magnuski
Harvey M. Ross
BY
Forman L. Mueller
Atty.

United States Patent Office 2,699,496

Patented Jan. 11, 1955

2,699,496

MICROWAVE RELAY TEST SYSTEM

Henry Magnuski, Chicago, and Harvey M. Ross, Broadview, Ill., assignors to Motorola, Inc., Chicago, Ill., a corporation of Illinois Application April 3, 1952, Serial No. 280,426

8 Claims. (Cl. 250—15)

The present invention relates to microwave radio communication systems, and more particularly to testing apparatus for indicating the condition of operation or failure of the links including the remote relay stations in the system.

Microwave radio relay communication systems generally comprise a plurality of stations linked in a chain, each having antenna beam directing and receiving elements that are optically visible to each other between successive stations in the chain. In order to take advantage of the profile of the terrain covered by the system, many of the relay stations are located at remote and relatively inaccessible places. The communication system is operative in both directions, and each relay station includes a receiver and transmitter for each direction of operation. Furthermore, many of the remote relay stations may be automatic in operation and therefore may be unattended. If any of the unattended relay stations in the chain should fail or develop a fault, the communications through such station would be interrupted or impaired. Prior to this invention, when such a failure occurred, it was necessary to dispatch a service man to check all unattended relay stations until the faulty station was found. The same procedure has also been necessary when correcting relay station difficulties not amounting to a complete breakdown of communications but causing excessive distortion and the like.

It is an object of the present invention to provide apparatus whereby the condition of operation or failure of links between remotely located unattended relay stations in a microwave radio relay network may be determined from any selected station in the network.

Another object of the invention is to provide apparatus for indicating at a selected test station of a microwave communication system the relative amount of harmonic distortion being transmitted by any one of the links between other remotely located relay stations in the system.

A feature of the invention is the provision of a test generator and receiver for applying and receiving a plurality of different test signal frequencies within a band of frequencies to the modulator and demodulator unit of a selected microwave radio station and the provision of a test signal fault filter at each relay station for interconnecting the receiver from one communication direction to the transmitter back in the opposite communication direction, with the filter of each station being tuned to a different one of the test signal frequencies, whereby the transmission and reception of each of the different selected test signal frequencies at the selected test station will indicate the operation or operational failure of that link including the remote relay station having the filter tuned to the selected test signal being transmitted.

Another feature of the invention is the provision of a test generator for transmitting from the selected microwave test station a plurality of different distortion test signal frequencies having a frequency of one-half or one-third, respectively, of the tuned signal frequency of each to the remote relay station fault filters, whereby the relative amplitude of the returned signal from a particular relay station will be an indication of the second or third harmonic signal transmission, respectively, of the link including that relay station, and hence an indication of its distortion.

Another feature of the invention as used in association with the fault locating system of tuned fault filters for each relay station is the provision of a combined generator and receiver circuit for transmitting and receiving fault test signals of the different signal frequencies of the tuned fault filters of each remote relay station, the generator and receiver circuit being arranged to automatically tune the receiver to the exact frequency of test signal being transmitted to be received back from a particular relay station.

Yet another feature of the invention as applied to microwave communication systems operable simultaneously in opposite directions is the provision of a sharply tuned bilateral bandpass fault filter for simultaneously interconnecting the receiver and the opposite direction transmitter for both directions of communication in the microwave radio relay station whereby the test generator and receiver may be connected to any other station in the system to be selected as the test station on either network side of the relay station links to be tested.

Further objects, features, and the attending advantages of the invention will be apparent with reference to the following specification and drawings, in which.

Figure 1:
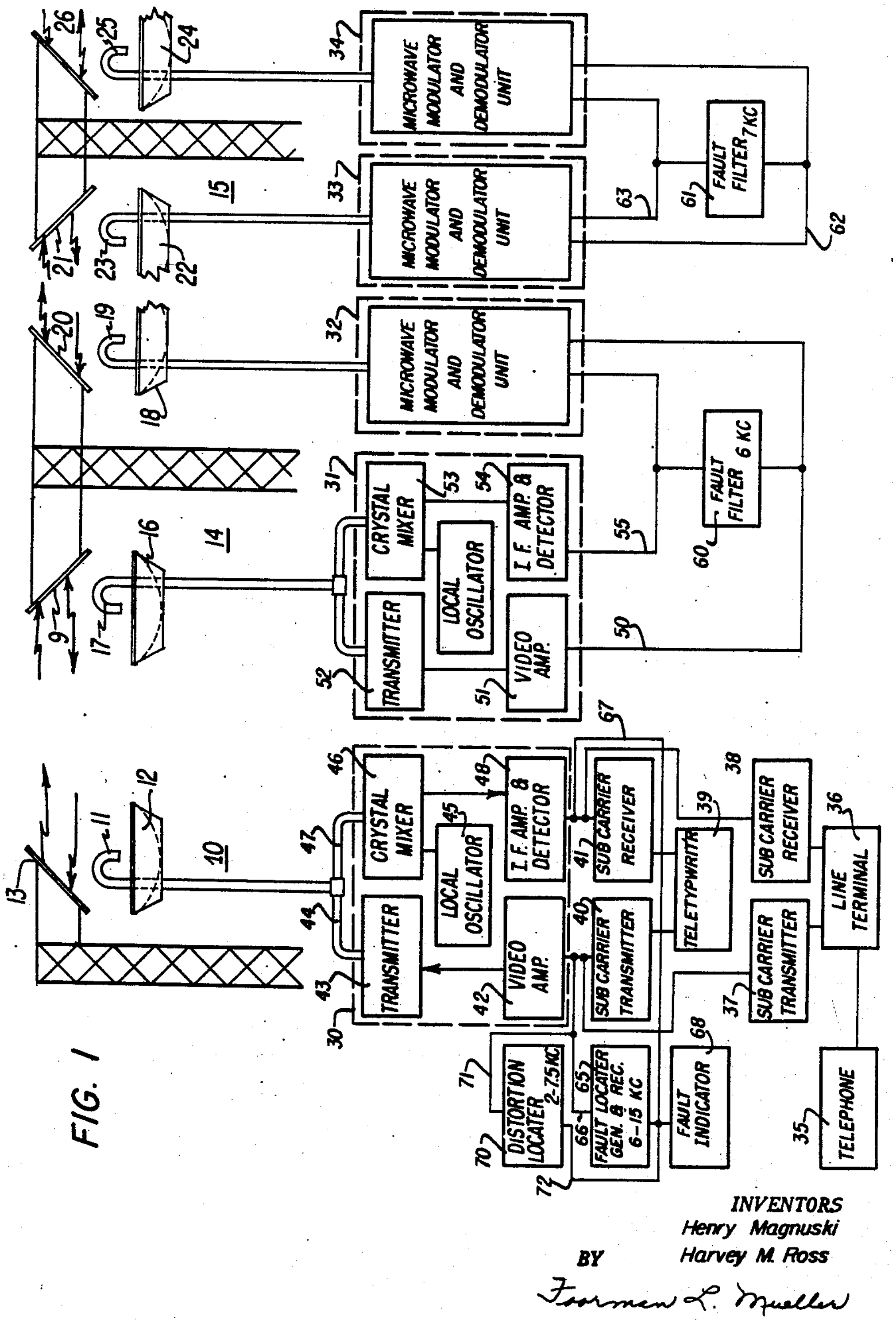
Figure 1 is a diagrammatic drawing partly in block outline of a microwave radio communication system embodying the fault and distortion locating test equipment of the invention.

The test apparatus of the invention is intended to be used with a microwave radio relay communication system of the type in which each relay station includes a receiver and transmitter for each direction of communication. According to the invention, each remote relay station is provided with a sharply tuned bilateral band pass filter for simultaneously interconnecting the receivers and the opposite direction transmitters for both directions of communications so that upon receiving a test signal having a frequency to which the filter is tuned, the received test signal will be transmitted back along the network in the direction from which it was received. A combined test signal generator and receiver arranged to generate and receive fault test signals having a plurality of different frequencies within a band of frequencies is adapted to be connected to any one of the microwave stations in the network to transmit and receive the test signal frequency to and from the microwave radio relay station having the fault filter tuned to the same fault test signal frequency. A preferred manner of operating the test apparatus to indicate and locate the operational failure of the link including the remote relay station in the network is to transmit from the selected test station a test signal having a frequency the same as the tuned frequency of the fault filter of the next succeeding station in the relay system. If a return test signal is received, the operation of the first link including the next succeeding station is indicated. The test generator and transmitter is then tuned to transmit a test signal having the same frequency as the tuned fault filter frequency of the second succeeding station in the network, and so on down the chain of relay stations until a return signal is not received. The frequency of test signal being tranmitted but not returned is an indication of the failure of that particular relay link including the remotely located relay station having the fault filter tuned to the said test signal frequency. The provision of bilateral fault filters for interconnecting the receivers and the opposite direction transmitters for both communication directions of a relay station enables the test equipment to be connected to any relay station in the network for locating the faulty relay station link in either direction from the selected test station, simply by transmitting the predetermined fault signal frequency in the required direction.

The fault locating apparatus described in the foregoing paragraph may also be used to determine second and third harmonic signal transmission and hence distortion of remote relay station links. For such purpose, a test signal generator arranged to transmit test signals having a frequency one-half or one-third, respectively, of the fault filter frequency of a remote relay station is provided. In addition, means is provided to indicate the relative amplitude of the returned signal which is therefore an indication of a second or third harmonic generation respectively of the microwave radio relay link including the station whose fault filter is tuned to twice or three times the frequency of the distortion test signal, depending upon the frequency of the test signal.

In operating either the fault locating apparatus or the distortion locating apparatus, the fault locating receiver is automatically tuned to the frequency of the fault filter of the relay station under test when the fault signal generator is tuned to transmit the predetermined fault signal frequency. In order to obtain the automatic tuning of the receiver, a system of double conversion is employed whereby the transmitted test signal is converted to an intermediate frequency signal and the returned test signal is combined with the intermediate frequency signal to produce a received signal with the same intermediate frequency regardless of the different frequency of fault signal which may be transmitted and received.

For a more detailed understanding of the invention, reference will be made to Figure 1 of the drawings which shows a terminal station and two relay stations of a microwave radio relay communication system with which the invention may be used. The terminal station 10 includes an antenna horn 11, parabolic reflector 12, and plane reflector 13 for simultaneous transmission and reception of microwave energy to and from the next succeeding relay station 14. At the relay station 14, a plane reflector 9, parabolic reflector 16, and antenna horn 17 are arranged to transmit and receive microwave energy to and from the terminal station 10. The relay station 14 also includes a parabolic reflector 18, antenna horn 19, and plane reflector 20 for transmitting and receiving microwave energy to and from the second succeeding relay station 15 having the plane reflector 21, parabolic reflector 22 and antenna horn 23. The relay station 15 also includes a parabolic reflector 24, antenna horn 25, and plane reflector 26 for receiving and transmitting microwave energy to and from a third successive relay station (not shown). It should be understood that any number of relay stations may be used as required by the length of the communication system. Furthermore, a duplicate terminal station, similar to the terminal station 10, is provided at the remote end of the communication network. It is not believed necessary to describe in detail the various aspects of the microwave communication system which are not affected by the operation of the present invention.

The terminal station 10 includes a microwave modulator and demodulator unit 30, while each of the relay stations 14 and 15 includes similar microwave modulator and demodulator units for each direction of transmission, such as shown at 31, 32, and 33, 34, for relay stations 14 and 15 respectively. The invention will be particularly described in connection with its application to the frequency modulated type of microwave communication system arranged for multiplex operation of a plurality of signals. In the interest of simplifying the drawings, an arrangement for multiplex operation of two signals only will be described. The telephone 35 is connected through the telephone line terminal 36 to a frequency modulated sub-carrier transmitter 37 and the sub-carrier FM receiver 38. A teletypewriter 39 is connected to a frequency modulated sub-carrier transmitter 40 and the sub-carrier FM receiver 41. The frequency modulated sub-carrier signals from the transmitters 37 and 40 are combined and amplified in the modulation video amplifier 42 of the terminal station microwave modulator and demodulator unit 30. The modulation signal from the video amplifier 42 is applied to frequency modulate the microwave transmitter 43 which is connected by the wave guide 44 to the antenna horn 11. The demodulator portion of the terminal station includes the local oscillator 45 and crystal mixer 46 connected to the waveguide 47 to transform the received microwave energy from the antenna 11 to a frequency modulated signal of an intermediate frequency which is amplified and demodulated by the intermediate frequency amplifier and detector stages 48. The sub-carrier receivers 38 and 41 are connected to the output of the intermediate frequency amplifier and detector 48.

Each of the relay stations 14 and 15 includes duplicate microwave modulator and demodulator units which may be substantially identical to that described in connection with the terminal station modulator and demodulator unit 30. For example, the sub-carrier frequency modulated signals to be transmitted from the relay station 14 back to the terminal station 10 are connected by the coaxial line 50 to the video amplifier 51, and the microwave transmitter 52. The microwave energy received by the antenna 17 of the relay station 14 from the terminal station 10 passes through the crystal mixer 53 and intermediate frequency amplifier and detector 54 to the coaxial line 55 for connection to the transmitter portion of the microwave modulator and demodulator unit 32 for transmission by the antenna 19 in the direction toward the next succeeding relay station 15. Such relay station arrangement may be duplicated at each successive relay station in the network.

According to the invention, a sharply tuned bilateral band pass fault filter 60 is connected between coaxial lines 50 and 55 to thereby interconnect the receivers and the opposite direction transmitters for both communication directions as provided in the microwave modulator and demodulator units 31 and 32. Similarly, a fault filter 61 is connected between the coaxial lines 62 and 63 in the next succeeding relay station 15 to thereby interconnect the receivers and opposite direction transmitters for both communications directions of that relay station at the particular frequency to which the fault filter 61 is tuned. For example, the fault filter 60 may be tuned to a signal frequency of 6 kc., while the fault filter 61 may be tuned to a signal frequency of 7 kc. Successive relay stations (not shown) may also be provided with fault filters each tuned to a different signal frequency spaced apart by one kilocycle with respect to each other. In the application of the invention to the particular type of frequency modulated microwave communication system being described, as many as ten fault filters may be used having different frequencies of operation within a range of 6 to 15 kc. Since not all of the relay stations may be unattended to require the use of a fault filter, the provision of ten different fault filter signal frequencies is ample for most purposes.

In Figure 1 of the drawings, the fault locator signal generator and receiver 65 is shown to be connected to the terminal station 10, although it should be understood that the fault locator 65 may be connected to any one of the relay stations selected as the test station so long as the bilateral type of fault filter 60 or 61 is used. This will be more apparent when the circuit details of the fault filter and their operation are later described. The fault locator test signal generator and receiver 65 is arranged to generate a modulation signal having a frequency within the range of 6 kc. to 15 kc. and connected by the cable 66 to the video amplifier 42 for modulating the microwave transmitter 43. The receiver portion of the fault locator signal generator and receiver 65 is connected by the cable 67 to the intermediate frequency amplifier and detector 48 of the terminal station 10. An indicator 68 is connected to the output of the receiver portion of the fault locator 65, and is arranged to indicate the return reception of the signal having a frequency which is the same as the test signal being transmitted by the signal generator of the fault locator 65. It should therefore be apparent that, when the terminal station 10 and relay station 14 are operating properly, a fault test signal having a frequency of 6 kc. and transmitted by the terminal station 10, will be received at the relay station 14 and transferred by the fault filter 60 from line 55 to line 50, whereupon the test signal will again be transmitted back from the relay station 14 to the terminal station 10. The returned signal is connected by line 67 to the fault locator receiver and fault indicator 68. If a return signal of 6 kc. is not indicated by the fault indicator 68, it is apparent that the link including microwave modulator and demodulator units 30 and 31 of the terminal station 10 and relay station 14 is defective. If a return signal having a frequency of 6 kc. is received, the fault locator generator 65 may be tuned to transmit a test signal having a frequency of 7 kc. which should then be received by the microwave modulator and demodulator unit 33 of the second successive relay station 15, and transferred from line 63 to line 62 by the fault filter 61 for transmitting back a return signal having a frequency of 7 kc. to the terminal station 10. Thereafter the fault locator generator 65 may be operated to transmit successive signals spaced 1 kc. apart in the range of 6 to 15 kc. until a return signal is not received, which thereby indicates the failure of the link including the particular relay station having the fault filter tuned to the particular test signal frequency being transmitted.

In addition to determining the operation of failure of any one of the relay station links, the test apparatus of the invention may be used to indicate the harmonic distortion generated by a link including a particular remote relay station. To this end, the distortion locator signal generator and receiver 70 is arranged to generate a test signal having a frequency one-half or one-third of the signal frequency to which the fault filter of each relay station is tuned. In the system being described wherein ten different fault filters tuned to different signal frequencies spaced one kc. apart within the range of 6 kc. to 15 kc. are used, the distortion locator generator should be enabled to generate a signal within the range of frequencies of 2 kc. to 7.5 kc., which is one-third of the lowest fault filter frequency and one-half of the highest fault filter frequency respectively. For distortion checking purposes the fault indicator 68 may be adapted to indicate the relative amplitudes of the return signals, which signals are harmonic signals having a frequency twice or three times the frequency of the test signal being transmitted by the distortion generator 70. Upon comparing the amplitude of the return harmonic signals with the amplitude of the fundamental distortion test signal being transmitted from the distortion generator 70, an indication of the second and third harmonic signal transmission and, hence, distortion of the remote relay station link will be obtained.

The generated signal from the distortion locator 70 may be connected by the line 71 to the video amplifier 42, while the returned signal may be connected through lines 67 and 72 to the receiver portion of the distortion locator 70. The particular manner of interconnecting the fault locator generator and receiver 65 and the distortion locator generator and receiver 70 is more clearly shown in Figure 2 of the drawings to which reference will now be made for a description of the specific elements of both the fault locator 65 and distortion locator 70. The fault generator includes a master oscillator 75 of the variable frequency type to generate a fault test signal having a frequency within the range of 6 kc. to 15 kc. The output of the generator 75 is connected by the line 76 to the cathode follower connected amplifier 77 whose output is connected by the line 78 to the terminal 79 of the test selector switch 80. The movable arm of the selector switch 80 is connected by line 81 to the terminal 82 which is adapted to be connected to the input circuit of the video amplifier of the selected microwave station from which the test is to be made. As shown in Figure 1 of the drawings, the terminal 82 may be connected to line 66 for connection to the video amplifier 42 of the terminal station 10. The output signal from the master oscillator 75 is also connected by the line 83 to the balanced modulator 84 where it is mixed with a signal having a frequency of 100 kc. from the crystal oscillator 85 to produce an intermediate frequency output signal in line 86 having a frequency within the range of 85 kc. to 94 kc., depending upon the frequency of the test signal in line 83. The signal in line 86 is passed through a bandpass filter 87 tuned to the range of 85 kc. to 94 kc., and is connected by line 88 to a rejection filter 89 which is tuned to reject the passage of signals having a frequency of 100 kc.

The returned test signal having a frequency within the range of 6 kc. to 15 kc. as received from the intermediate frequency amplifier and detector 48 of the terminal station 10 is applied to the terminal 90 and connected by line 91 to the variable step attenuator 92 and amplifier 93 to be later described in more detail. The amplified return signal from the amplifier 93 is connected by the line 94 to a low pass filter 95 having an upper frequency limit of 20 kc. The output signal from the low pass filter 95 is mixed with the intermediate frequency signal in line 98 from the rejection filter 89 by the balanced modulator 96 to produce a second intermediate frequency received signal having a frequency of 100 kc. in line 97. The low pass filter 95 prevents the intermediate frequency signal passed through the rejection filter 89 from passing through the balanced modulator 96 to line 94 and the receiver portions of the microwave station. Similarly, the rejection filter 89 prevents the 100 kc. signal produced by the balanced modulator 96 from passing back toward the balanced modulator 84, and in such manner undesirable interaction between the various circuits is minimized.

Assuming the master oscillator 75 of the fault generator to be adjusted to transmit a test signal having a frequency of 6 kc. for determining the operation of the first link including remote relay station 14 having the 6 kc. fault filter 60, a signal having a frequency of 94 kc. will be connected by lines 86, 88 and 98 to the balanced modulator 96. If the relay station 14 is operating properly, the return signal having a frequency of 6 kc. as applied to the input terminal 90 will be ultimately passed through the low pass filter 95 to the balanced modulator 96, and a signal having an intermediate frequency of 100 kc. will thereby be produced in line 97. If the master oscillator 75 is adjusted to provide a test signal having a frequency of 6 kc. for the purpose of testing the link including relay station 15 having the fault filter 61 tuned to 7 kc., the intermediate signal frequency in line 98 will be 93 kc. which, when mixed by the balanced modulator 96 with a return signal of 7 kc., will again produce an intermediate frequency received signal in line 97 having a frequency of 100 kc. It is therefore apparent that the system of double conversion as described automatically tunes the receiver portion of the fault locator generator and receiver 65 to the particular frequency of fault signal being transmitted by the variable frequency master oscillator 75.

The return signal appearing in line 97 is amplified by the tuned intermediate frequency amplifiers 99 and 100, and rectified by the rectifier 101. The rectified signal from the rectifier 101 may be further amplified at 102 and connected by the selector switch 103, as shown in the solid line position, to the meter load 104 and fault indicator meter 105. Alternatively, the switch 103 may be moved to the dotted line position for connecting the rectified return signal to a relay 106 for controlling the operation of a buzzer 107 or other external alarm indicator to be connected to the output jack 108. With the switch 103 in the dotted line position, a continuous check may be made of the system linkage up to and including any one of the remote relay stations in the network. For example, the master oscillator 75 may be tuned to transmit continuously a test signal having a frequency of 6 kc. for the purpose of monitoring the operation of the remote relay station 14 having the fault filter 60 tuned to 6 kc. So long as a return signal is received by the rectifier 101 and relay amplifier 102, the relay 106 will be energized to prevent energization of the buzzer 107. If the link including the relay station 14 should thereafter fail and a return signal is no longer received, the relay 106 is deenergized to energize the buzzer 107 which therefore gives an audible warning signal that such link is no longer operating. Alternatively, the fault generator 75 may be tuned to transmit a test signal having a frequency corresponding to the tuned frequency of the fault filter at the furthest remote station and with the switch 103 in the dotted line position, the continuous operation of the entire network from the test station to the furthest remote station will be monitored.

When it is desired to determine the second or third harmonic signal distortion of a link or links including a remote relay station such as the relay station 14, the test selector switch 80 is moved to the dotted line position which connects the variable frequency oscillator 110 of the distortion test signal generator and receiver 70 to line 81 and terminal 82. In order to determine the second harmonic distortion of the link including relay station 14 having the fault filter 60 tuned to 6 kc., the variable frequency oscillator 110 is adjusted to produce an output signal having a frequency of 3 kc. which is one-half of the tuned frequency of the fault filter 60. If it is desired to check the third harmonic distortion of the link including relay station 14, the variable frequency oscillator 110 is adjusted to produce an output signal having a frequency of 2 kc., which is one-third of the tuned frequency of the fault filter 60.

For purposes of providing a general indication of the amount of second and third harmonic distortion of the relay station 14 the switch 80 is first moved to the solid line position and a test signal having a frequency of 6 kc. is transmitted to the relay station 14 from the master oscillator 75. At the same time the amplitude of the signal being transmitted is indicated by the output meter 111, and this amplitude is compared with the indicated amplitude of the return signal on the receiver meter 105. Thereafter the switch 80 is thrown to the dotted line position, and the variable frequency oscillator 110 is adjusted to transmit a signal of 3 kc. which is one-half the tuned frequency of the fault filter 60. The amplitude of the transmitted signal as indicated by the meter 111 may then be compared with the amplitude of the returned signal indicated by the receiver meter 105 and a general indication of the second harmonic signal generated by the link including the relay station 14 is thus obtained. Similarly the variable frequency oscillator 110 may be adjusted to produce an output signal having a frequency of 2 kilocycles per second in order that indications by the meters 111 and 105 may provide general information as to the amount of third harmonic produced by the links including the relay station 14.

In order to facilitate the relative indication of distortion by the meters 105 and 111, the step attenuator 92 may be employed. For example, with the switch 80 in the solid line position for purposes of transmitting the fundamental frequency to which the fault filter 60 of relay station 14 is tuned, the gain of the amplifier 77 may be adjusted to produce a predetermined amplitude of test signal to be transmitted as indicated by the output meter 111. The step attenuator 92 is then adjusted to provide maximum attenuation consistent with an indication of amplitude of return signal by the receiver meter 105. The switch 80 is thereafter moved to the dotted line position, and the variable frequency distortion oscillator 110 is adjusted to produce an output signal having a frequency of 3 kc. with an amplitude producing a similar deviation of the output meter 111. The step attenuator 92 is then adjusted to lower the attenuation of the received return signal until the receiver meter 105 is giving the same indication as previously obtained when the fundamental signal frequency was transmitted and received. The step attenuator 92 may be calibrated in terms of decibel level and its readjusted postion will then indicate in decibel terms the second harmonic distortion of the link including the relay station 14.

The invention has thus far been described with the use of block diagram inasmuch as all of the various elements composing the invention may take many well-known forms. However, it is believed desirable to illustrate schematically a circuit of the various elements composing the invention as they may be arranged in one embodiment of the invention.

Figure 2:
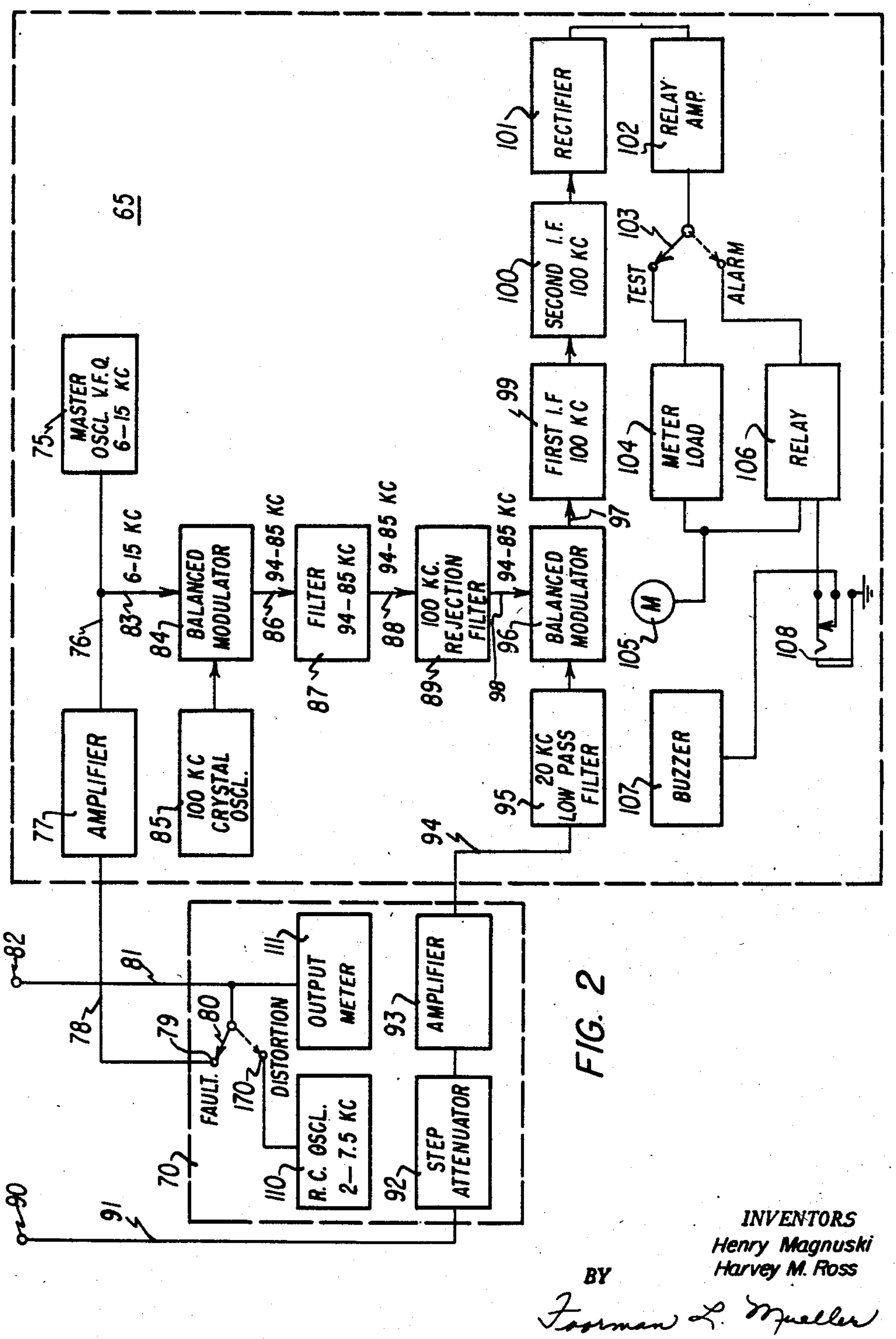
Figure 2 is a block diagram of the specific circuit stages used in the fault and distortion locating generators and receivers.
Figure 3:
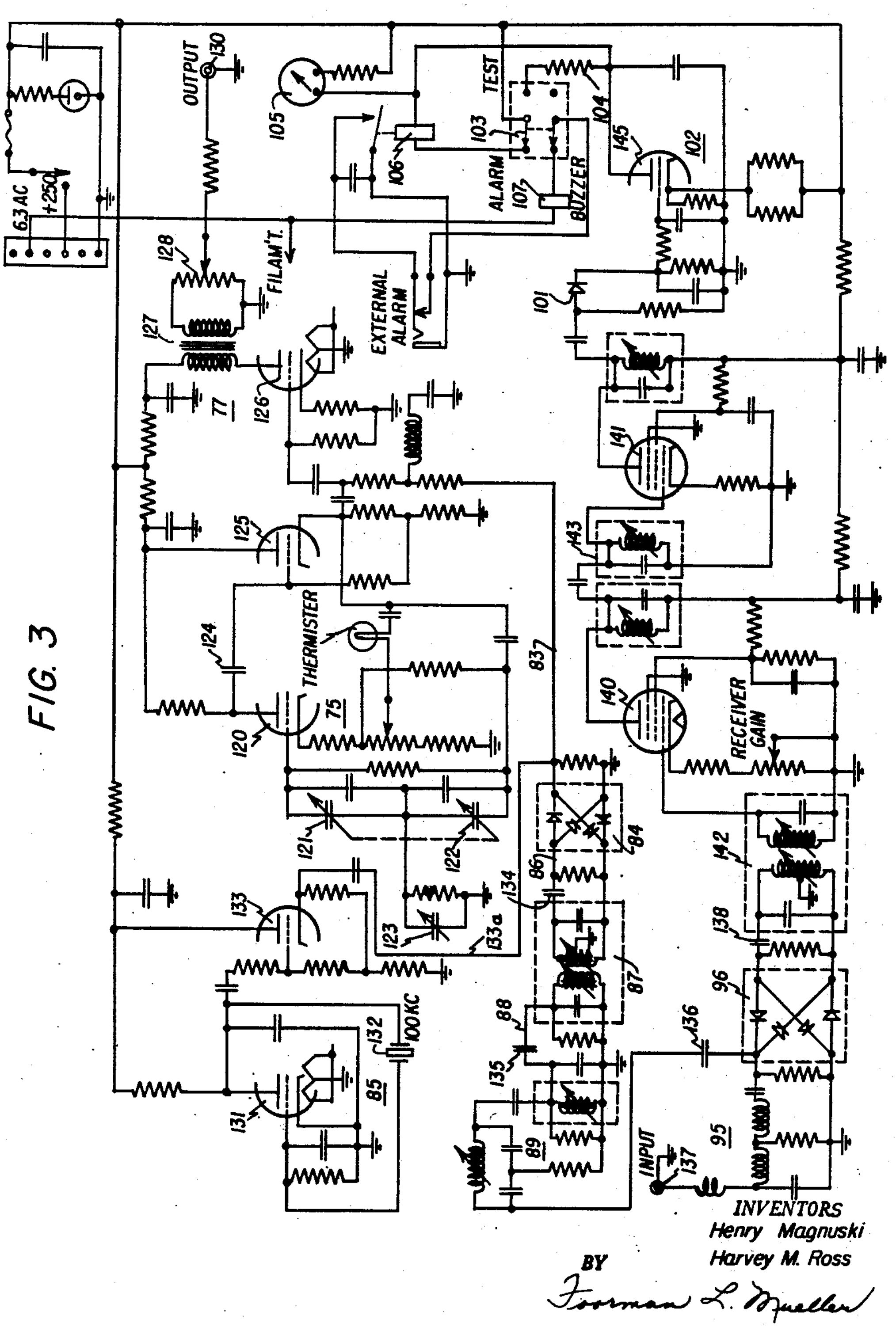
Figure 3 is a circuit diagram of the fault locating test signal generator and receiver.

Figure 3 of the drawings is a circuit diagram of all of the elements of the invention pertaining to the fault locator generator and receiver 65 which were enclosed by the dotted lines on Figure 2 of the drawings. It is not believed necessary to describe in detail all of the circuit connections shown in Figure 3 since their manner of connection is readily apparent from the schematic drawing. The triode tube 120 is connected in a variable frequency oscillator circuit including the variable tuning condensers 121, 122, and 123, together with the associated resistors to provide an output signal tunable in the range of 6 kc. to 15 kc. across the coupling condenser 124. The triode tube 125 is connected as a cathode follower amplifier for amplifying the oscillator output signal and applying the amplified output signal to the final power amplifier triode tube 126. The oscillator tube 120 and associated circuit components corresponds to the master oscillator 75 shown in Figure 2 of the drawings, while the amplifier tubes 125 and 126, together with the transformer 127 and output potentiometer 128 correspond to the amplifier section 77 shown in Figure 2 of the drawings. The output terminal 130 is adapted to be connected by line 78 of Figure 2 to the test selector switch 80.

Triode tube 131 is connected in a crystal oscillator circuit including the crystal 132 to provide an output signal having a freqeuncy of 100 kc. and corresponds to the oscillator 85 of Figure 2 of the drawings. The crystal oscillator is coupled by the cathode follower connected amplifier tube 133 and line 133*a* to the modulator 84 where the signal from the oscillator 85 is mixed with the output from the variable frequency oscillator 75 as appearing in line 83. The intermediate frequency output signal from the balanced modulator 84 is connected through line 86 and coupling condenser 134 to the bandpass filter 87 tuned to pass signals having a frequency within the range of 85 kc. to 94 kc. The output from the bandpass filter 87 is connected by line 88 and coupling condenser 135 to the 100 kc. rejection filter 89 whose output is connected by the coupling condenser 136 to the balanced modulator 96. The returned test signal in line 94 from the amplifier 93 and step attenuator 92 shown in Figure 2 of the drawings is applied from the input terminals 137 through the low pass filter 95 having an upper pass limit of 20 kc. to the balanced modulator 96. The received intermediate frequency output signal from the balanced modulator 96 is connected by the coupling condenser 138 to the tuned intermediate frequency amplifier stages including tubes 140 and 141 and tuned circuit elements 142 and 143 tuned to the received intermediate frequency signal of 100 kc. The amplified output from the second intermediate frequency amplifier tube 141 is connected to be rectified by the rectifier 101 and amplified by the direct current relay amplifier tube 145 in the relay amplifier circuit 102. The switch 103 is shown in Figure 3 of the drawings to be a double pole, double-throw switch which is arranged to connect the signal from the direct current relay amplifier tube 145 to the meter load circuit 104 and meter 105, or to the buzzer relay 106 and buzzer 107 selectively, depending upon the switch position.

Figures 4, 5:
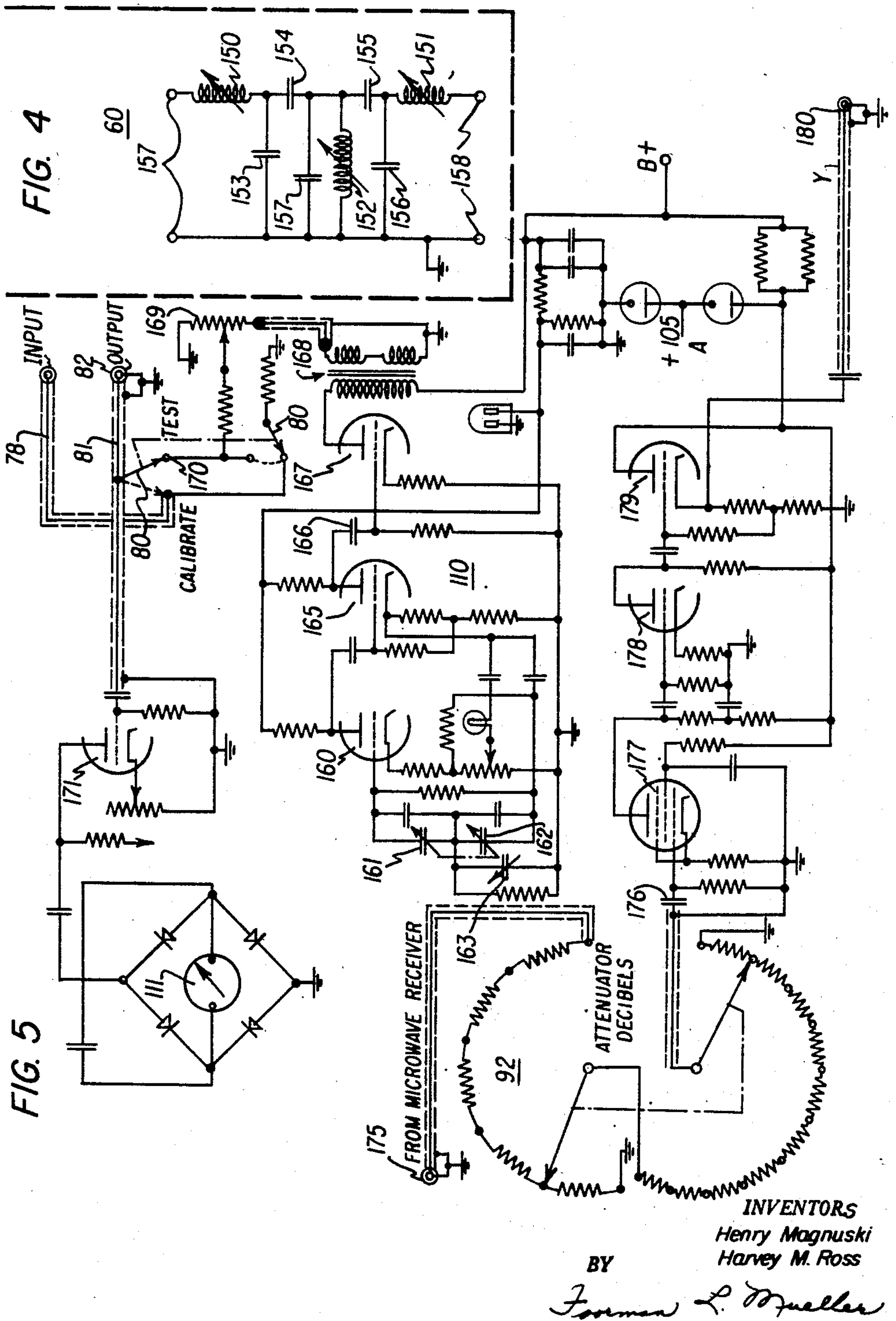
Figure 4 is a circuit diagram of the bilateral fault filter for interconnecting the receivers and transmitters of each remote relay station.
Figure 5 is a circuit diagram of the distortion test signal generator and receiver.

A circuit diagram of the sharply tuned bilateral fault filter as may be used at each of the remote relay stations is shown in Figure 4 of the drawings. The fault filter includes the variable inductances 150, 151, and 152 together with the associated condensers 153 through 157 tuned to permit the passage of selected frequency signals therethrough in either direction applied to either pair of terminals 157 or 158. Terminals 157 may be connected with the coaxial cable 50, and terminals 158 may be connected with the coaxial cable 55 of a relay station such as that shown at the relay station 14 of Figure 1 of the drawings. Since the fault filter 60 shown in detail in Figure 4 of the drawings is operable in either direction, it should be apparent that the test signals may be received by either the microwave modulator and demodulator unit 31, or the microwave modulator and demodulator units 32, and returned by the corresponding transmitter of the modulator and demodulator unit receiving the signal so that the fault locator and generator 65 may be connected at any relay station or terminal station on either side of the relay station 14. The inductance 150 and condenser 153 form a first series tuned circuit and the inductance 151 and condenser 156 form a second series tuned circuit. Both series tuned circuits are identical and are connected together and to a parallel tuned circuit including inductance 152 and condenser 153 by the coupling condensers 154 and 155. Thus a sharply tuned filter 60 operable to pass signals in both directions is provided.

With reference to Fig. 5 of the drawings, one form of the circuit details of the elements of the distortion generator and receiver 70 which were shown to be enclosed by the dotted lines of Fig. 2 will be described. The variable frequency oscillator 110 includes the triode tubes 160 and 165 connected in a circuit with the variable condensers 161, 162, 163 together with the associated resistances arranged to generate an output signal having a frequency of 2 kc. to 7.5 kc. The output signal from the oscillator 110 is connected by the coupling condenser 166 to the power amplifier including the triode tube 167. An output transformer 168 connects amplifier tube 167 to the potentiometer gain control 169 and the switch terminal 170 of the test selector switch 80. A tube 171 is connected in a vacuum tube voltmeter circuit with the output meter 111 to indicate the amplitude of the test signals in line 81 to be connected by terminal 82 to the video amplifier of the selected test microwave transmitting station. When the switch 80 is moved to the dotted line position, the signal in line 78 from the amplifier 77 and variable frequency oscillator 75 of the fault signal generator is connected to line 81, and the meter 111 then indicates the amplitude of such signal. The returned signal from the intermediate frequency amplifier and detector 48 of the selected test microwave station is applied to the terminals 175 and to the step attenuator 92 which is preferably calibrated with decibel level. The signal from the attenuator 92 is connected by the coupling condenser 176 to the resistance coupled amplifier including electron tubes 177, 178, and 179 to the output terminal 180. The output terminal 180 may be connected by line 94, to the terminal 137 and the low pass filter 95 of the fault locator generator and receiver 65 as shown by Figures 2 and 3 of the drawings.

In the foregoing, the invention has been described in connection with its particular application to a frequency modulated communication system wherein the fault and distortion test signal frequencies can best be used within the range of 2 kc. to 15 kc. The invention is not limited, however, to the use of such a range of frequencies for the test signals, nor is it limited to its application to a frequency modulated type of microwave communication system. Under certain conditions of operation, the use of test signals having frequencies in other than the range of 2 kc. to 15 kc. may be suitable.

Various modifications may be made within the spirit of the invention and the scope of the appended claims.

We claim:

1. In a microwave radio communication system operable in both directions to and from a microwave station and having a plurality of remote linking relay stations each having a transmitter and receiver for each direction of communication, the apparatus for indicating at the microwave station the failure of a link including any one of the remote relay stations and the distortion of a link including any one of the operating relay stations and including in combination, means at the microwave station for generating a plurality of test signal frequencies within a first band of frequencies and for applying the test signals to the transmitter of the microwave station, means for generating a plurality of test signal frequencies within a second band of frequencies including one third of the lowest frequency and one half of the highest frequency of said first band of frequencies and for applying the test signals to the transmitter of the microwave station, each relay station having filter means to respond to a selected different one of said first band of test signal frequencies and connected to transmit the test signal back to the microwave station, frequency selector means at the microwave station adapted to receive the plurality of signals in the first band of frequencies transmitted back from the relay stations, said frequency selector means including a local oscillator and mixer connected to beat with the selected test signal frequency in the first band of frequencies to be transmitted to thereby produce a signal of intermediate frequency, a second mixer for mixing the received test signal with the signal of intermediate frequency to produce a second intermediate frequency signal having the same frequency as said local oscillator, an amplifier for amplifying the second intermediate frequency signal, and means connected to said amplifier to indicate the reception and the amplitude at the microwave station of the plurality of test signals within the first band of frequencies whereby the failure to receive a selected test signal frequency will indicate the operational failure of the link including that remote relay station having the means to receive and transmit back the selected test signal frequency, and the amplitude of the received test signal frequency when test signals in the second band of frequencies corresponding to second and third sub multiples of the selected filter frequency of that remote relay station are transmitted is an indication of the second and third harmonic distortion of the link including that operating remote relay station.

2. In a microwave radio communication system operable in both directions to and from a microwave station and having a plurality of remote linking relay stations each having a transmitter and receiver for each direction of communication, the apparatus for indicating at the microwave station the distortion of a link including any one of the remote relay stations and including in combination, first means at the microwave station for generating a plurality of first test signals within a first band of frequencies and for applying the test signals to the microwave station transmitter, second means for generating a second band of test signals within a range of one third of the lowest frequency and one half of the highest frequency of said first band of frequencies and for applying the test signals to the microwave station transmitter, each relay station having filter means to connect a selected different one of said first band of test signals from the relay receiver for receiving the test signal from the microwave station to the relay transmitter for transmitting back to the microwave station, frequency selector means at the microwave station adapted to receive the plurality of test signals in the first band of frequencies transmitted back from the relay stations, said frequency selector means including a local oscillator and mixer connected to beat with the selected test signal in the first band of frequencies to be transmitted to thereby produce a signal of intermediate frequency, a second mixer for mixing the received test signal with the signal of intermediate frequency to produce a second intermediate frequency signal having the same frequency as said local oscillator, an amplifier for amplifying the second intermediate frequency signal, and means connected to said amplifier to indicate the amplitude of the received plurality of test signals, whereby the amplitude of a received selected test signal frequency during transmission of the first test signal in the first band of frequencies in comparison to the amplitude of a received test signal during transmission of a test signal with a sub multiple of one half and one third of the first test signal frequency by the second generating means is an indication of the distortion by the link including that selected relay station having the filter means responding to the first selected test frequency signal.

3. In a microwave radio communication system operable in both directions to and from a microwave station and having a plurality of remote linking relay stations each having a transmitter and receiver for each direction of communication, the apparatus for indicating at the microwave station the failure of a link including any one of the remote relay stations and including in combination, means at the microwave station for generating any one of a plurality of test signals within a band of frequencies and for selectively applying the test signals to the transmitter of the microwave station, each relay station having filter means to respond to a selected different one of said test signal frequencies and to transmit the selected signal back to the microwave station, a test receiver at the microwave station, said test receiver including a local oscillator and mixer connected to beat with the selected test signal frequency to be transmitted to thereby produce a signal of intermediate frequency, a second mixer for mixing the received test signal with the signal of intermediate frequency to produce a second intermediate frequency signal having the same frequency as said local oscillator, an amplifier for amplifying the second intermediate frequency signal, and means connected to said amplifier to indicate the reception at said test receiver of signals of the frequency of the test signal transmitted, whereby the failure to receive a selected test signal frequency will indicate the operational failure of the link including that remote relay station having the filter means to receive and transmit back the selected test signal.

4. In a microwave radio communication system operable in both directions to and from a microwave station and having a plurality of remote linking relay stations each having a transmitter and receiver for each direction of communication, the apparatus for indicating at the microwave station the failure of a link including any one of the remote relay stations and including in combination, means at the microwave station for generating a plurality of test signals spaced one kilocycle apart within a band of 6 to 15 kc. and for applying the test signals to the transmitter of the microwave station, each relay station having filter means to respond to a selected different one of said test signal frequencies and to transmit the selected signal back to the mircowave station, a test receiver at the microwave station, said test receiver including a local oscillator with an oscillation frequency of 100 kc. and a mixer connected to beat with the selected test signal frequency to be transmitted to thereby produce a signal of intermediate frequency within the range of 85 to 94 kc., a second mixer for mixing the received test signal within the range of 6 to 15 kc. with the signal of intermediate frequency to produce a second intermediate frequency signal having a frequency of 100 kc., an amplifier tuned to 100 kc. for amplifying the second intermediate frequency signal, and means connected to said amplifier to indicate the reception at said test receiver of the mircowave station of any one of the plurality of test signal frequencies whereby the failure to receive a selected test signal frequency will indicate the operational failure of the link including that remote relay station having the filter means to receive and transmit back the selected test frequency signal.

5. In a microwave radio communication system operable in both directions to and from a microwave station and having a plurality of remote linking relay stations each having a transmitter and receiver for each direction of communication, the apparatus for indicating at the microwave station the distortion of a link including any one of the remote relay stations including in combination, first tunable generator means at the microwave station for selectively applying to the microwave station transmitter first test signals within a first band of frequencies, second tunable generator means at the microwave station for selectively applying to the microwave station transmitter second test signals within a frequency range including second and third sub multiples of said first band of frequencies, means for indicating the amplitude of said first and second test signals applied to said microwave station transmitter, each relay station having filter means including a sharply tuned bilateral bandpass filter which responds to a selected different frequency in said first band of test frequencies, said filter means being connected between the relay receiver for receiving the signal from the microwave station and the relay transmitter for transmitting back to the microwave station, and frequency selector means at the microwave station coupled to the receiver thereof and tuned with said first generator means to receive the test signals transmitted back from the relay stations, said frequency selector means including means to indicate the amplitude of the returned test signals, whereby the amplitude of the first test signal for a particular relay station returned thereby to the microwave station in comparison to the amplitude of the second and third harmonics of the sub multiple second test signals passed by said filter means of said particular relay station and returned thereby to the microwave station is an indication of the second and third harmonic distortion of the link including said particular relay station.

6. In a microwave radio communication system operable in both directions to and from a microwave station and having a plurality of remote relay stations forming a plurality of interconnected links, each station having a transmitter and receiver for each direction of communication, with the relay stations operating without an operator, the apparatus for indicating at the microwave station the failure of a link including any one of the remote relay stations and the harmonic distortion of a link including any one of the operating relay stations, said apparatus including in combination, means at the microwave station for generating a plurality of test signals within a first band of frequencies and a plurality of test signals within a second band of frequencies including one third of the lowest frequency and one half of the high frequency of said first band of frequencies, means for selectively applying the test signals to the transmitter of the microwave station, each relay station having filter means to select a different test signal within said first band of frequencies and connected to transmit the selected test signal back to the microwave station, frequency selector means at the microwave station adapted to receive the test signals in said first band of frequencies transmitted back from the relay stations, said frequency selector means including a local oscillator and mixer connected to beat with the received test signal to thereby produce a signal of intermediate frequency, a second mixer for mixing the received test signal with the signal of intermediate frequency to produce a second intermediate frequency signal having the same frequency as said local oscillator, an amplifier for amplifying the second intermediate frequency signal, and means connected to said amplifier to indicate the reception and the amplitude at the microwave station of test signals within said first band of frequencies, whereby the failure to receive a particular test signal will indicate the operational failure of the link including that remote relay station having the means to select and transmit back the particular test signal, and the amplitude of the received signals in response to the application to the transmitter of the microwave station of test signals in the second band of frequencies corresponding to second and third submultiples of the filter frequency of a particular remote relay station is an indication of the second and third harmonic distortion of the link including the particular remote relay station.

7. In a microwave radio communication system operable in both directions to and from a microwave station and having a plurality of remote relay stations forming a plurality of interconnected links, said stations having transmitters and receivers for providing communication in both directions with the relay stations operating without an operator, the apparatus for indicating at the microwave station the harmonic distortion of a link including any one of the remote relay stations including in combination, tunable generator means at the microwave station for selectively applying to the microwave station transmitter first test signals within a first band of frequencies and second test signals within a frequency band including second and third submultiples of said first band of frequencies, means for indicating the amplitude of said first and second test signals applied to said microwave station transmitter, each relay station having filter means including a sharply tuned bilateral bandpass filter which responds to a selected different frequency in said first band of test frequencies, said filter means being connected between the relay receiver for receiving the signal from said microwave station and the relay transmitter for transmitting back to said microwave station, and frequency selector means at said microwave station coupled to the receiver thereof and tuned with said generator means to receive the test signals transmitted back from the relay stations, said frequency selector means including means to indicate the amplitude of the returned test signals, whereby the amplitude of the first test signal returned by a particular relay station to the microwave station in comparison to the amplitude of the second and third harmonics of the submultiple second test signals passed by said filter means of said particular relay station and returned thereby to the microwave station is an indication of the second and third harmonic distortion of the link including said particular relay station.

8. In a microwave radio relay communication system including a microwave station and a plurality of relay stations, the latter of which are not attended by an operator, with each station having transmitter and receiver means for providing first and second channels communicating in opposite directions from station to station, the method of indicating at the microwave station the operation and distortion of the channels extending between the microwave station and the remote relay station including the steps of, applying to the transmitter of the microwave station first test signals within a first band of frequencies, selectively transferring signals received from the microwave station on one channel back to the microwave station over the other channel, with each relay station transferring signals of one particular frequency within said first band, selecting the test signals received at the microwave station, measuring the signals received at the microwave station in response to transmission of said first test signals to indicate the operation of the channels from the microwave station to the various relay stations, applying to the transmitter of the microwave station second test signals having frequencies which are the second and third submultiplies of the frequencies in the first band of frequencies, receiving at the microwave station signals within the first band of frequencies transferred by the relay stations, measuring the signals received at the microwave station in response to the transmission of said second test signals, and comparing the signals resulting from said first test signals with the signals resulting from said second test signals to indicate the second and third harmonic distortion of the channel extending from said microwave station to the various relay stations.

References Cited in the file of this patent

UNITED STATES PATENTS

| | | |
|---|---|---|
| 2,250,950 | Goldsmith | July 29, 1941 |
| 2,287,044 | Kroger | June 23, 1942 |
| 2,345,951 | Smith | Apr. 4, 1944 |
| 2,514,367 | Bond et al. | July 11, 1950 |